United States Patent [19]

Minolla

[11] 4,100,657

[45] Jul. 18, 1978

[54] DETENT ACTION BUCKLE

[75] Inventor: Horst Minolla, Norderstedt, Germany

[73] Assignee: Klippan GmbH Hamburg, Germany

[21] Appl. No.: 703,381

[22] Filed: Jul. 7, 1976

[51] Int. Cl.² ............................................. A44B 11/26
[52] U.S. Cl. .............................. 24/230 AL; 24/211 N
[58] Field of Search ...... 24/230 R, 230 AL, 230 AN, 24/211 N

[56] References Cited

U.S. PATENT DOCUMENTS

| 2,255,695 | 9/1941 | Bull | 24/211 N |
| 3,706,117 | 12/1972 | Axisa | 24/230 AL |
| 3,935,618 | 2/1976 | Fohl | 24/230 AL |

FOREIGN PATENT DOCUMENTS

| 2,341,601 | 2/1975 | Fed. Rep. of Germany ... 24/230 AL |

Primary Examiner—Kenneth J. Dorner

Attorney, Agent, or Firm—Roger H. Criss

[57] ABSTRACT

A safety belt buckle which permits release of a tongue by the application of minimal pressure on a tongue release member, even under conditions of great stress, yet having strength and reliability. When the tongue is inserted in the buckle it forces a tongue ejecting member back against a biasing force, and an outwardly biased tongue release member moves forward in response to its bias, forcing a detent, such as a roller, into an opening in the tongue. The detent continues to extend into a similar coincident opening in a plate contiguous with the tongue, thus locking the tongue in the buckle. Applying slight pressure to the tongue release member, to slide it back against its bias, provides sufficient space above the opening so that the detent is free to leave the opening in the tongue. The tongue is then ejected from the buckle by the ejector which comes to rest below the opening in the plate, thus retaining the detent out of the path of an inserted tongue.

13 Claims, 7 Drawing Figures

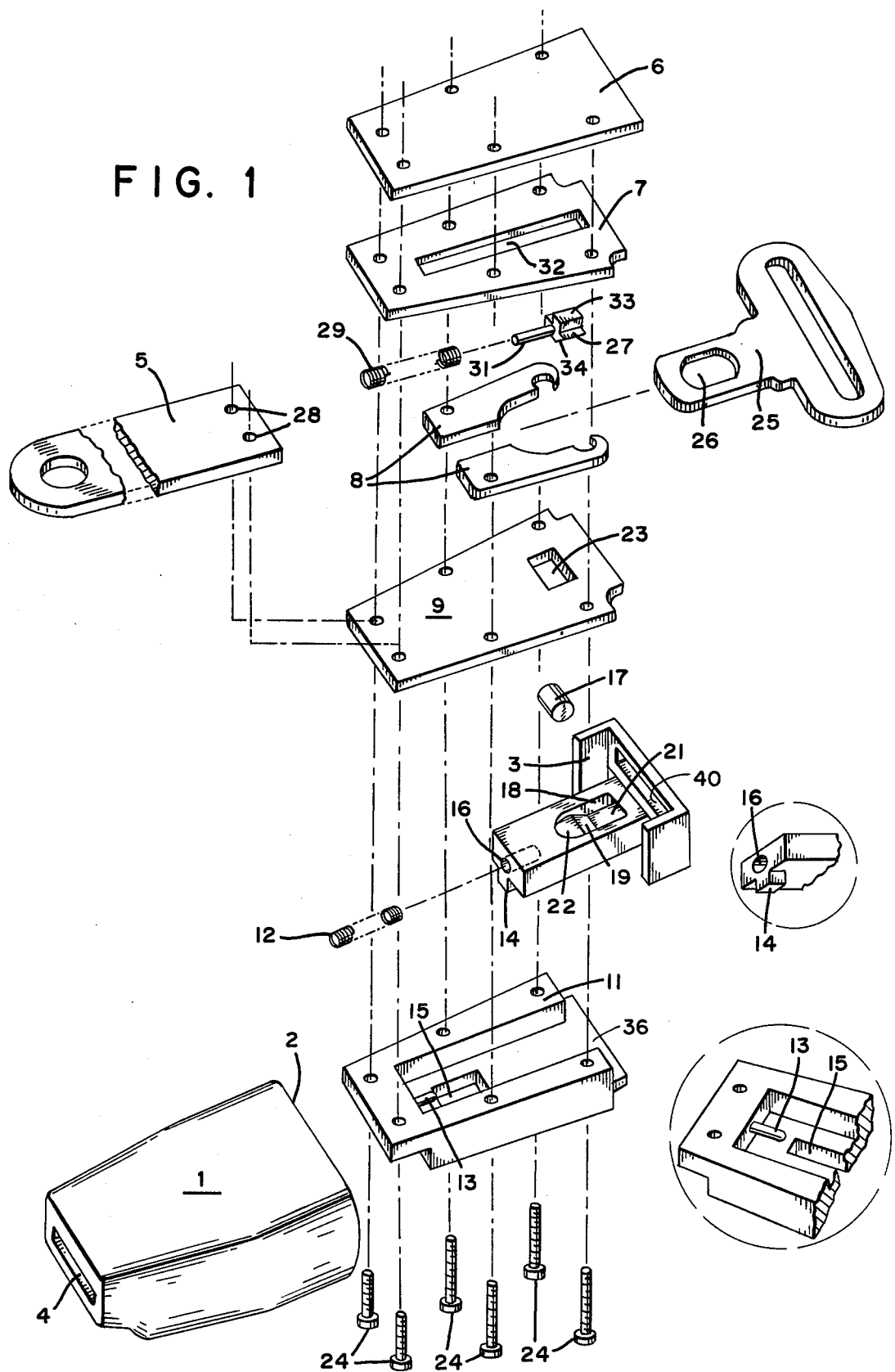

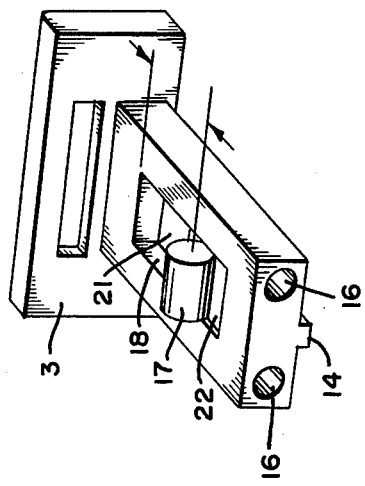
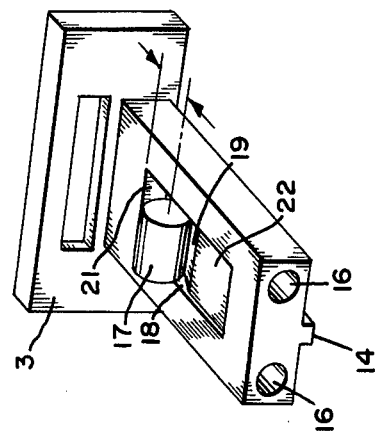
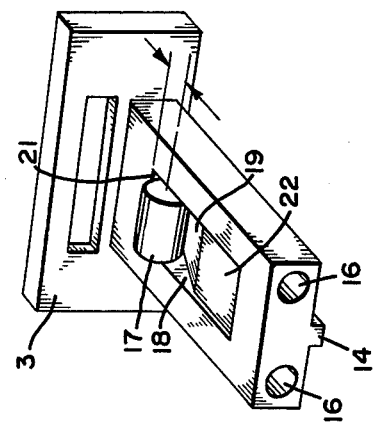
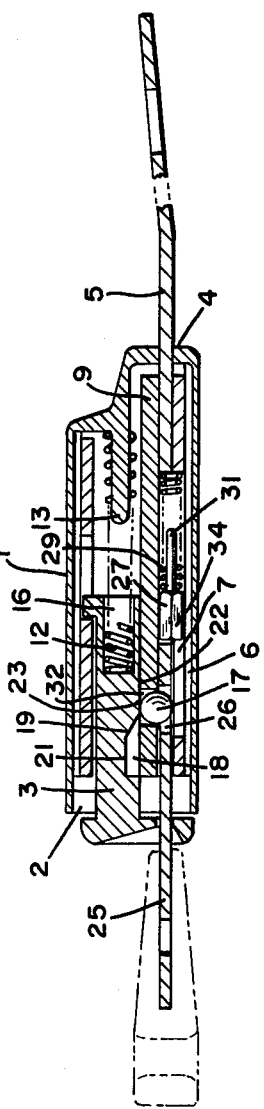
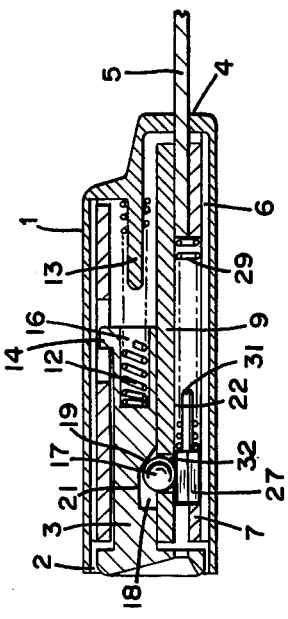

DETENT ACTION BUCKLE

BACKGROUND OF THE INVENTION

1. Field of the Invention

The invention relates to a buckle for receiving and engaging a tongue. The buckle may be used in a safety belt system in a vehicle such as an automobile or airplane, for retaining an occupant in a seated position within the vehicle. The buckle may be attached to the frame or body of the vehicle by a relatively short, rigid or semi-rigid connector. The cooperating tongue may be attached to one or two flexible passenger restraints disposed over the lap, or the lap and chest of the user, and also attached to the body or frame of the vehicle.

2. Description of the Prior Art

A large number of buckle and tongue combinations are found in the prior art, practically all of which incorporate a buckle having some type of latching means co-acting with a tongue. Safety belt buckles which differ in design from that of the present invention are disclosed in U.S. Pat. No. 3,851,360 to H. Minolla; and U.S. patent application, Ser. No. 663,942, filed Mar. 4, 1976 in the name of R. L. Stephenson.

It is an object of the present invention to provide a rugged and functional buckle which cannot be unlatched by the application of stress; yet a buckle wherein the tongue can be released by the application of a minimal effort by the user, even when the buckle is under stress.

SUMMARY OF THE INVENTION

The present invention is directed to a positive-acting buckle and tongue combination which can withstand tremendous stress directed to pulling the latched tongue from the buckle, because of its novel construction. The tongue can be unlatched, however, by application of a minimum of effort to the tongue release member against a slight outward bias, even when the buckle is under great stress. In fact, such stress would actually serve, in small measure, to further reduce, rather than increase, the pressure required to release the tongue.

The tongue, having an opening in the forward portion, is inserted between two plates, the first having an opening therethrough, closed on one side, when the tongue is not inserted, by an outwardly biased tongue ejector, slideably positioned between the plates for motion in line with the direction of insertion and ejection of the tongue. When the tongue is inserted it displaces the tongue ejector against its bias, and when fully inserted, the tongue's opening coincides with the opening in the first plate, thus together with the plate, forming a small chamber.

By the term "plate" we refer to a buckle component having at least one flat surface. Two such plates separated, but with their flat surfaces parallel and facing each other, provide the space for receiving the tongue. Whereas these can be actual plates having parallel sides, yet in practice these plates could be integrated with other components such as guide members, by molding techniques, to lose their platelike characteristics.

An outwardly biased tongue release member having a flat surface in sliding contact with the first plate, has in its contacting surface an elongated cavity, which is longer, preferably about twice as long, as the opening in the first plate. This tongue release member is slideable from a first position where the forepart of the cavity is over the opening, and is at least as deep as the thickness of the tongue; and a second position where the rear part of the cavity is over the opening, but is shallow, having less depth than the thickness of the tongue.

A detent, such as a roller or sphere, is within the chamber formed by the opening in the plate and the cavity in the tongue release member when the tongue release member is in its first position with the deep section of the cavity over the opening in the plate. The detent is retained in this chamber when the tongue is not inserted, by the tongue ejector which rests beneath this opening. By the term "detent," we mean a latching member such as a pellet, roller, or sphere, preferably a roller shaped pellet fabricated of metal which lies free in the chamber with its axis of symmetry perpendicular to the path of the tongue on insertion and ejection. When the forepart of the tongue release member forms part of this chamber, there is room within the chamber formed by the first plate and this tongue release member to fully contain the detent, consequently the tongue is ejected and the ejector moves to retain the detent in that chamber.

But when the tongue is inserted, the tongue ejector is moved by its bias to its second position where there is insufficient room for the detent in the chamber formed by the shallow cavity and the opening in the first plate, and the detent must extend down into the opening in the tongue, locking it in place, to be released only by sliding the tongue release against its bias, to its first position by applying slight manual pressure.

The diameter of the roller is preferably equal to about the combined thickness of the tongue and the first plate. It can be seen that any force applied to withdraw the tongue without first depressing the tongue release member would result in a shearing stress on the detent produced by the tongue and the first plate. The latch could not be forced without either breaking the buckle or tearing the tongue or the first plate apart. The detent could be a roller of case hardened steel. It could alternately be a steel sphere such as a ball bearing, or two or more such spheres arranged side by side.

Preferably, the deep section of the cavity in the surface of the tongue release member, and the shallow section, are connected by a short sloping surface. Therefore, if considerable stress is applied to the tongue and buckle; and under this circumstance the tongue release member is pressed, then when the roller reaches the sloping surface, the stress transmitted to the roller by the tongue would serve to further reduce the small amount of force required to release the tongue. This effect is not significant except to point out that the stress can in no way increase the effort required to unbuckle in an emergency.

BRIEF DESCRIPTION OF THE DRAWINGS

FIG. 1 is an exploded perspective view of the buckle of the present invention. It has been drawn upside down, with respect to FIG. 3, to better present the novel features of the invention. Two inserts are also included, repeating certain features for greater clarity.

FIGS. 2A, 2B and 2C are perspective views illustrating the relation between the tongue release member and the latching detent when: (A) the detent is in the tongue release position; (C) the detent is in the latched or locked position; and (B) the detent is in the intermediate position between conditions shown in FIGS. 2A and 2C. FIGS. 2A, 2B and 2C also illustrate a slight variation in the preferred embodiment, from the tongue release member of FIG. 1, namely in the shape of the buckle face, and in the fact that two springs are employed rather than one to bias the tongue release member forward to its latched position.

FIGS. 3A and 3B are longitudinal cross sections in elevation illustrating (A) the buckle ready to receive the tongue, and (B), the same buckle with the tongue latched in place.

DETAILED DESCRIPTION OF THE PREFERRED EMBODIMENT

Figure 4:
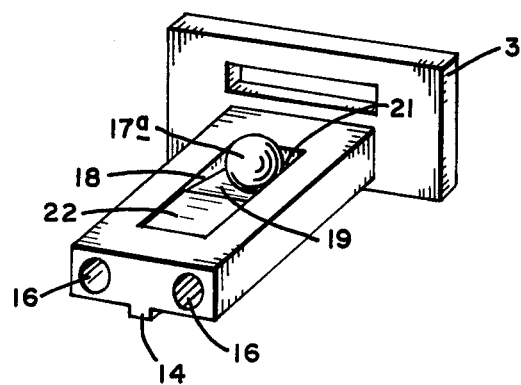
FIG. 4 is a view similar to FIG. 2A except that the detent is a sphere.

With particular reference to FIG. 1, but also to FIGS. 2 and 3, my invention is directed to a buckle for receiving and engaging a tongue. The buckle comprises: a housing 1 having an opening at the front end 2 to provide access to a tongue release member 3; and an opening 4 through which a metal strap 5, or other passenger restraint attached to the buckle, extends. The buckle includes a first or perforated locking plate 9 and a second or slotted plate 7.

In the exploded view of FIG. 1, several elements are shown as separate members for clarity, whereas they can conveniently be molded or otherwise fabricated as single units. For example, cover plate 6, slotted plate 7 and tongue guides 8 can be combined as a single unit. Alternately the tongue guides 8 can be a part of perforated locking plate 9. Conversely, the guide 11 for the tongue release member 3 can, if desired, be made of several different members, including a third plate 36.

In the tongue release member 3 shown, the front end serves as the front face of the buckle, having a slot 40, an outer portion of which is somewhat funnel-shaped to guide the tongue 25 into the buckle.

To assemble, place spiral spring 12 over projection 13 which extends from the inner rear wall of the tongue release guide 11. This projection is not critical; a depression in this rear wall to receive the end of the spring would serve as well. Also, as shown in FIGS. 3A and 3B, the spring can extend inwardly from the rear of the housing 1.

Now slip the tongue release member 3 into guide 11, with tab 14 extending into limiting slot 15 in the third plate 36. The free end of spring 12 extends into the cylindrical opening 16 in the end of the tongue release member. The spring 12 now urges the tongue release member 3 outward until stopped as a result of the tab 14 reaching the end of slot 15 within which it rides.

Next, place peforate locking plate 9 over the tongue release member, then drop detent 17, which is preferably a roller fabricated of a metal such as steel, into the rectangular opening 23 of the perforate locking plate 9, so that it drops into cavity 18 in the surface of the tongue release member 3.

The tongue release member may slide in and out within the distance permitted by limiting slot 15, but the detent 17, which in all positions of the tongue release member extends up into the rectangular opening 23 of the perforate locking plate, is limited to a small degree of vertical movement with respect to the horizontally disposed perforate locking plate.

FIG. 2A illustrates the positions of the detent 17 in the cavity in the surface of the tongue release member 3. This cavity, in its forward section 21, is about as deep as the radius of the detent 17. At its rearward section 32 the depression is shallow, and the two levels are connected by a sloping surface 19. In FIG. 2A, the detent 17 is in the deep end 21 of the cavity 18, hence extends up into the opening of the perforate locking plate, but not beyond it. If the tongue release member 3 is moved outward in response to its biasing spring 12, the detent 17 is forced up the sloping surface 19 within the cavity 18 as in FIG. 2B. and onto the shallow portion 22 of the cavity as in FIG. 2C. The detent 17 now has been raised vertically well beyond the top of the rectangular opening 23 of the perforate locking plate. The longitudinal center of the detent 17 is disposed in a plane separate from the plane through which the tongue 25 slides in the buckle.

Returning to the exploded view of FIG. 1, and to continue the assembly, place tongue guides 8 over perforate locking plate 9 with the openings for screws or rivets 24 aligned with the corresponding openings in tongue release guide 11. Together, their forward inner surfaces now provide a guide for directing and positioning tongue 25 with its opening 26 directly over opening 23 in the perforate locking plate 9. The rear, substantially parallel inner surfaces of the tongue guides 8 also permit the passage of a tongue ejector 27.

Although metal strap 5 can be attached to the buckle in a variety of ways, it can conveniently be placed behind the tongue guides 8 on the surface of the perforate locking plate 9, with its two openings 28 aligned with those at the rear of said perforate plate 9.

Ejector spring 29 is next slipped over the projection 31 extending from the rear of tongue ejector 27, and together with the tongue ejector, it is placed within slot 32 of slotted plate 7, with the ejector forward. Tab 33 of the ejector 27 is slideably positioned in the slot with the lower portion 34 of the ejector below the slot 32 to slide along the under surface of the slotted plate 7.

Now place the slotted plate 7 over the tongue guides 8, with holes aligned with those in the guides 8 and the strap 5. The lower part of the tongue ejector will now be slideably positioned between the tongue guides in the path of the tongue on its insertion into the buckle. It is urged forward by ejector spring 29 as far as slot 32 will permit, and in this extended position, the lower portion 34 of ejector 27 is directly over the opening 23 in the perforate locking plate. In this position the ejector prevents detent 17 from extending up into the slot for the tongue 25 between plate 7 and 23.

Under the circumstances, detent 17 must be in the deeper end 21 of cavity 18 in the tongue release member 3, for there is insufficient room for it in the shallow portion 22 of the cavity, nor on the interconnecting sloping surface 19. It should be clear, therefore, that the detent 17 retains the tongue release member 3, containing cavity 18, in its "pressed back" position in opposition to the outward bias of spring 12.

Cover plate 6 has openings for alignment with those of slotted plate 7, but in the case of the cover plate, these openings are threaded to accept screws 24.

Finally, cover plate 6 is aligned with the openings in the slotted plate 7, and all those beneath it. Screws 24 are now inserted through the assembled parts and screwed into the openings in the cover plate. The complete assembly can now be fastened by any desired means within housing 1, with strap 5 extending from opening 4 of the housing, for attachment to the frame or body of a vehicle. Of course strap 5 may be any type of restraint such as a cable, belt, or any rigid or semi-rigid connector.

Actually, it is conceivable that one may choose to use the buckle without an outer housing, for with molded parts, the outer surfaces can easily be fabricated so that an outer housing is superfluous.

The buckle is now in the condition of FIG. 3A, ready to accept the tongue. FIGS. 3A and 3B also illustrate a slight variation in the embodiment of my invention, in that the spring 12 for exerting outward bias on the tongue release member 3, extends from a projection 13 in the back of housing 1.

In operation, when tongue 25 is inserted between the guides 8, it encounters the lower portion 34 of the tongue ejector, and forces it backward as permitted by slot 32, against the bias of spring 29. The forepart of the tongue 25 now takes over the function of retaining the detent 17 within the deeper portion 21 of the cavity 18 in the tongue release member, since it has replaced the ejector at this point by sliding it back. There is some upward pressure by the detent 17 against the forepart of the tongue, however, just as there was against the tongue ejector which previously prevented its upward movement. This upward pressure is occasioned by the fact that the spring 12 presses the sloping surface 19 against the detent 17. As soon as the tongue has been inserted to the point where its opening 26 is directly over opening 23 of the perforate locking plate, spring 12 forces the tongue release member forward, and the sloping surface 19 forces the detent 17 to the shallow section of cavity 18. The detent 17 now extends up into the opening 26 in the tongue and locks it securely in place. Even in its locking position, shown in FIG. 3B, the longitudinal center of the detent 17 is in a plane separate from the plane through which the tongue 25 moves in the buckle. The tongue release member now extends forward as shown in FIG. 3B. Any force applied to withdraw the tongue merely sets up a shearing force on the roller between opening 23 in the perforate locking plate, and the opening 26 in the tongue. It would therefore be impossible to remove the tongue in one piece without shearing the detent 17 in half (practically an impossibility), or breaking the buckle. The detent 17, which could be of case hardened steel, is able to withstand far greater stress than the latching members of practically all seat belt buckles of the prior art.

To release the tongue, the now extended face of the tongue release member which serves as a push button, is pressed in. As soon as the deeper section 21 of cavity 18 is over opening 23, the detent 17 moves upward in response to the pressure of the biased tongue, thus clearing the tongue. The tongue ejector 27, urged by spring 29, acting on the tip of the tongue, then forces it vigorously out of the slot. It is a novel feature of this buckle that no force need be applied to the tongue release member beyond that required to overcome the bias of its own spring 12, and a minimal amount of friction. There is even a slight assist. As soon as the sloping surface 19 becomes accessible to the roller 17, as the tongue release member 3 is pressed in, this upward force of the roller against the sloping surface also provides a slight force in the same direction as that required to release the tongue. This additional force being supplied by the ejector spring 29, serves to reduce the necessary force required to release the tongue, by a very small amount.

The detent need not necessarily be a roller, for one or two steel spheres 17a (FIG. 4) such as ball bearings could achieve the same end.

Most of the parts of this buckle can be made of polymeric material, thus providing a light weight buckle. Preferably the roller and the perforate locking plate are fabricated of metal.

While I have described preferred embodiments of my invention, it will be understood that various modifications and changes can be made in the buckle and tongue combination described without departing from the spirit of the invention or the scope of the following claims.

I claim:

1. A buckle for receiving a tongue comprising:
   (a) a buckle having a first and second plate, each with a flat surface parallel to that of the other, said surfaces being spaced to accept the forward part of the tongue between them, said forward part of the tongue and said first plate each having an opening therethrough, which openings substantially coincide when the tongue is fully inserted between the surfaces, thereby forming a chamber;
   (b) a detent disposed within the chamber formed by the first plate and the tongue when the latter is fully inserted;
   (c) a tongue release member having a slideable surface in contact with the upper surface of the first plate, said slideable surface of the tongue release member having an elongated cavity which is longer than the opening in the first plate, said tongue release member limited in its slideable motion from a first position where a forepart of the elongated cavity substantially coincides with the opening in the first plate, and a second position wherein the rear part of the elongated cavity substantially coincides with the opening in the first plate, said forepart of the elongated cavity having a depth such that taken together with the opening in the first plate, the detent can be completely contained in the space formed thereby, without extending beyond the exposed surface of the first plate, and the rear part of the elongated cavity having a depth less than that of the forepart, such that when taken together with the opening in the first plate, the detent cannot be completely contained in the space formed thereby, but extends beyond the exposed surface of the first plate; and
   (d) an outwardly biased tongue ejecting member, slideably positioned between the first and second plate in the path of the inserted tongue, said ejecting member limited in its forward movement in response to its bias, to a position to block the opening in the first plate, thereby retaining the detent in the closed space produced by the forepart of the cavity of the tongue ejecting member together with the opening in the first plate; whereby the inserted tongue displaces the tongue ejector allowing the detent to enter said chamber formed by the coincidence of the opening in the first plate with that of the inserted tongue, thus latching the tongue when the tongue release member is moved to its second position, but resulting in the ejection of the tongue when the tongue release member is moved to its first position.

2. The buckle of claim 1 wherein there is a short sloping section within the cavity of the tongue release member, interconnecting the deep portion of the cavity in the forepart, with the shallow portion of said cavity in the rear part.

3. The buckle of claim 1 wherein the detent is a cylindrical roller having a diameter about equal to the combined thickness of the first plate and the tongue, said roller being placed in the chamber with its longitudinal axis perpendicular to the direction of insertion of the tongue.

4. The buckle of claim 1 wherein the detent is at least one sphere having a diameter about equal to the combined thickness of the first plate and the tongue.

5. The buckle of claim 1 wherein the tongue release member is biased outwardly to a latched position wherein the rear part of the elongated cavity coincides with the opening in the first plate.

6. The buckle of claim 5 wherein the tongue release member is fixedly attached to a face plate for the buckle, and the face has a slot to accept the inserted tongue to guide it between the first and second plate, said face serving as a push button, whereby pressure on said push button against the bias of the attached tongue release member, slides the forepart of the cavity over the opening in the first plate, thereby allowing the detent to occupy the space formed by the coincidence of te forepart of the cavity with the opening in the first plate and releasing the tongue for ejection by the biased tongue ejector.

7. The buckle of claim 6 and further comprising: a third plate attached and parallel to the first plate, spaced to confine the tongue release member slideably between them, said tongue release member having a projection extending from the face opposite its cavity to cooperate with a short longitudinal slot in the third plate to limit the forward motion of the tongue release member in response to its bias.

8. The buckle of claim 1 wherein there is a longitudinal guiding slot in the second plate, and an extended portion of the tongue ejector shaped to ride in the slot, said slot limiting the forward movement of the ejector to the point where it blocks the openings in the first plate, and also limiting the ejector to longitudinal motion in line with the direction of insertion and ejection of the tongue.

9. The buckle of claim 1 wherein guiding members are positioned between the first and second plates to guide the inserted tongue into the space between them, to the position where the opening in the tongue coincides with the opening in the first plate.

10. The buckle of claim 7 wherein there are guides positioned between the first plate and the third plate for confining the tongue release member to longitudinal motion.

11. The buckle of claim 1 wherein said detent has a longitudinal center disposed in a separate plane from a plane through which the tongue passes in the buckle.

12. A safety belt buckle adapted for receiving a tongue comprising:
(a) a buckle having a first plate having an opening adjacent one end thereof;
(b) a detent member disposed in said opening;
(c) a release member adjacent to one surface of said first plate and having an elongated cavity which is longer than said opening in said first plate, said release member being movable with respect to said first plate from a first position wherein a forward portion of said elongated cavity substantially coincides with said opening in said first plate to a second position wherein a rear portion of said elongated cavity substantially coincides with said opening, said forward portion of said cavity having a depth such that taken together with said opening in said first plate said detent member is completely contained in the space formed thereby, without extending beyond a second surface of said first plate opposite said one surface, and said rear portion of said elongated cavity having a depth less than that of said forward portion, such that when taken together with said opening in said first plate, said detent member cannot be completely contained in the space formed thereby and extends beyond said second surface of said first plate,
said release member normally being in said first position and moving to said second position to lockingly engage said tongue with said buckle; and
(d) an outwardly biased tongue ejecting member adjacent to and movable with respect to said second surface of said first plate from a first position where said opening in said first plate is blocked, thereby retaining said detent member in said opening whereby said detent member does not extend beyond said second surface of said first plate, to a second position where said opening is not blocked whereby said tongue is lockingly engaged by said detent member, said release member being movable to its second position following insertion of said tongue in said buckle and said release member being manually engageable to return from its second position to its first position whereby said tongue ejecting member is movable by its bias from its second position to its first position to eject said tongue from said buckle.

13. The buckle of claim 12 wherein said detent is a cylindrical roller having a diameter about equal to the combined thickness of said first plate and tongue.

* * * * *